United States Patent
Saito et al.

(10) Patent No.: US 7,408,761 B2
(45) Date of Patent: Aug. 5, 2008

(54) FILM CAPACITOR AND METHOD OF MANUFACTURING THE SAME

(75) Inventors: Toshiharu Saito, Toyama (JP); Hiroki Takeoka, Osaka (JP); Toshihisa Miura, Toyama (JP); Makoto Tomita, Toyama (JP); Kohei Shiota, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 269 days.

(21) Appl. No.: 11/280,212

(22) Filed: Nov. 17, 2005

(65) Prior Publication Data

US 2006/0104006 A1  May 18, 2006

(30) Foreign Application Priority Data

Nov. 17, 2004 (JP) ............... 2004-333014

(51) Int. Cl.
*H01G 4/32* (2006.01)
*H01G 4/08* (2006.01)

(52) U.S. Cl. .................... 361/301.5; 361/323

(58) Field of Classification Search ......... 361/538–539, 361/323, 301.5
See application file for complete search history.

(56) References Cited

U.S. PATENT DOCUMENTS 3,221,217 A * 11/1965 Hucke ................. 361/539
3,491,269 A * 1/1970 Booe ................... 361/539
5,581,437 A * 12/1996 Sebillotte et al. ......... 361/323
6,212,058 B1 * 4/2001 Huber .................. 361/301.5
7,092,238 B2 * 8/2006 Saito et al. .............. 361/329

FOREIGN PATENT DOCUMENTS

| JP | 54-063300 | 5/1979 |
| JP | 56-101731 | 8/1981 |
| JP | 05-18020 | 3/1993 |

* cited by examiner

*Primary Examiner*—Eric Thomas
(74) *Attorney, Agent, or Firm*—McDermott Will & Emery LLP

(57) ABSTRACT

A film capacitor suited to car-mount application, excellent in heat cycle tolerance and humidity resistance, and high in productivity, while maintaining low heat generation and low inductance characteristic is provided. The film capacitor comprises a film capacitor element, a bus bar as metal terminal connected to electrode of this film capacitor element, and a case for containing them, in which the film capacitor element and bus bar are packed within the case by plural layers of epoxy resin compositions, and the plural layers of epoxy resin compositions are composed so that the coefficient of linear expansion is smallest in the composition disposed in the uppermost layer.

11 Claims, 4 Drawing Sheets

FILM CAPACITOR AND METHOD OF MANUFACTURING THE SAME

TECHNICAL FIELD

The present invention relates to a film capacitor used in electronic appliance, electric appliance, industrial machine, and automobile, and a method of manufacturing the same. More particularly, it relates to a film capacitor used in motor driving inverter circuit of hybrid electric vehicle (HEV) or the like, for the purposes of smoothing, filter or snubber.

BACKGROUND ART

A metallized film capacitor is generally used by putting a capacitor element in a case to prevent invasion of surrounding humidity, and armoring by pouring various potting resins. Roles of potting resin and case are retention and insulation of contained capacitor element and components, and prevention of deterioration of characteristics. It is hence necessary to select materials excellent in mechanical strength, low water absorption, heat resistance, heat cycle resistance, and electrical characteristics (insulating performance). Potting resins include epoxy resin and urethane resin.

Recently, in inverter system for driving motor of hybrid electric vihicle(HEV), film capacitors excellent in dielectric strength, low loss and temperature characteristics are gradually replacing the existing aluminum electrolytic capacitors. Since car-mount capacitors are used in cold district, and hot and damp district, as higher heat cycle resistance in a wide range of temperature and humidity is demanded than in consumer electric appliances. It is also required to have a structure small in heat generation if a high ripple current flows, or a structure having low inductance characteristics in order to suppress generation of surge voltage.

FIG. 7 is a sectional view of a conventional film capacitor. In an ordinary structure of film capacitor, a metal terminal 23 connected to an electrode 22 of a film capacitor element 21 is projected from a potting resin 24. In this case, when a heat cycle from low temperature (for example, −50 to −40° C.) to high temperature (for example, 90 to 120° C.) is applied, a thermal stress is generated due to difference in coefficient of thermal expansion between the potting resin 24 and metal terminal 23, and the potting resin 24 may be cracked it not withstanding the stress.

To overcome such problem, it has been proposed to prevent crack by improving armoring resin materials.

For example, as disclosed in Japanese Utility Model Application Laid-Open No. H5-18020 (document 1), Japanese Patent Application Laid-Open No. S56-101731 (document 2), and Japanese Patent Application Laid-Open No. S54-63300 (document 3), by using two or more layers of resin as armoring material of film capacitor element, it is proposed to improve the environmental resistance, mechanical strength, and explosion-proof property. In these proposals, the resin of first layer directly covering the film capacitor element is made of a urethane resin of smaller strength and elasticity than epoxy resin, and the second layer at the case opening side is made of epoxy resin.

For example, document 3 does not relate directly to film capacitor, but suggests improvement of heat cycle resistance, by blending inorganic filler by 40 to 95 vol. %, so that the difference in coefficient of linear expansion between the conductor or electric device and hardened matter of thermosetting resin for covering them directly may be 15 ppm/K or less.

However, the prior arts involve some problems as discussed below. In the structure of document 1 or document 2 in which urethane resin is disposed around the film capacitor and an epoxy resin is disposed on the upper layer, if exposed to temperature of −40° C., the epoxy resin layer of surface is cracked.

In the car-mount film capacitor, a low inductance characteristic is demanded in order to realize low exothermic property and suppress surge voltage. To satisfy these requirements, the bus bar electrode terminal connected to the film capacitor element is broadened in width (increased in sectional area), so that low resistance and low inductance are realized. However, in the structures disclosed in document 1 and document 2, when the bus bar electrode buried in the resin is broadened, it is found that cracks are likely to be formed in the armor resin. In particular, at ambient temperature of −40 to 100° C., cracks are formed in all samples in heat cycle test.

When the film capacitor element is covered with a soft urethane resin, the element size increases, and when expansion or shrinkage amount increases, motion of film capacitor element cannot be restrained, and repetitive stresses occur in the electrode portion of film capacitor element, thereby increasing tanδ.

Or when the film capacitor element is covered with urethane, moisture is absorbed easily, and humidity resistance is not expected. Or as in document 3, when the amount of inorganic filler is increased so as to decrease the coefficient of linear expansion of hardened matter, liquid viscosity when pouring the resin (60° C.) becomes very high, 5000 to 20000 mPa·s. If such resin is poured in a large amount, voids are likely to occur in the resin, and pouring time must be extended, and other problems occur in working efficiency and productivity.

When the technology of document 3 is applied in film capacitor, difference in coefficient of linear expansion from metal electrode material is decreased, and cracks of resin upon heat cycle may be prevented, but difference in coefficient of linear expansion is increased, to the contrary, from the film capacitor element having the coefficient of linear expansion about one digit higher, and capacitor characteristics are likely to deteriorate in long-term heat cycle durability.

DISCLOSURE OF THE INVENTION

The film capacitor of the invention comprises a film capacitor element, a metal terminal connected to the electrode of this film capacitor element, and a case for containing them. The film capacitor element and metal electrode are packed within the case by plural layers of epoxy resin composition. The plural layers of epoxy resin composition are formed in layers, and are composed so that the coefficient of linear expansion may be smallest in the epoxy resin composition disposed in the uppermost layer.

In other example, the plural layers of epoxy resin composition are formed in layers, and are composed so that the blending amount of inorganic filler may be largest in the epoxy resin composition disposed in the uppermost layer.

In these configurations, difference in coefficient of linear expansion may be decreased between the epoxy resin composition disposed in the uppermost layer which originates cracks, and the metal terminal. As a result, occurrence of resin cracks due to heat cycle can be prevented. Hence a film capacitor of excellent humidity resistance and high reliability is obtained.

Another film capacitor of the invention has plural layers of epoxy resin composition formed in layers, and is composed so that the thermal conductivity may be largest in the epoxy resin composition disposed in the uppermost layer.

As a result, heat diffusion can be enhanced in the epoxy resin composition disposed in the uppermost layer which originates cracks, and local thermal stress can be relaxed. As a result, occurrence of resin cracks due to heat cycle can be prevented, and a film capacitor of excellent in humidity resistance and low exothermic characteristic and high in reliability is obtained.

A manufacturing method of film capacitor of the invention comprises a step of connecting a metal terminal to electrode of film capacitor element, and a step of putting the film capacitor element into a case together with metal terminal. It further comprises a step of pouring a first epoxy resin composition, and a step of heating and curing the first epoxy resin composition for a specified time. It also comprises a step of pouring a second epoxy resin composition of smaller coefficient of linear expansion than the first epoxy resin composition, on the first epoxy resin composition. It also comprises a step of heating and curing the second epoxy resin composition for a specified time. As a result, the resin pouring time at each step is short, and the productivity can be further enhanced.

DETAILED DESCRIPTION OF THE PREFERRED EMBODIMENTS

Embodiment 1

Figure 1A:
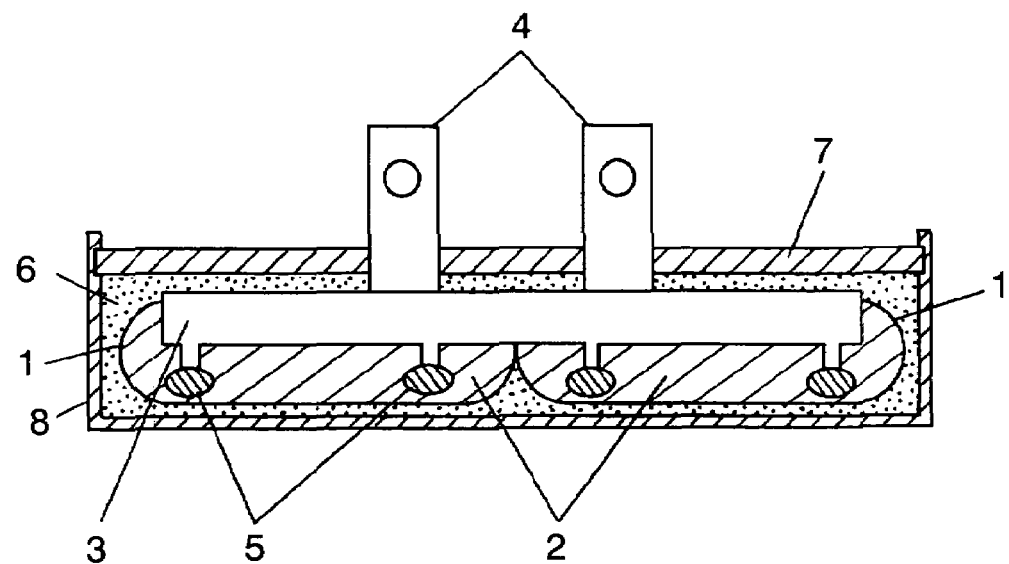
FIG. 1A is a side view as seen from spray electrode direction of film capacitor of embodiment 1 of the invention.
Figure 1B:
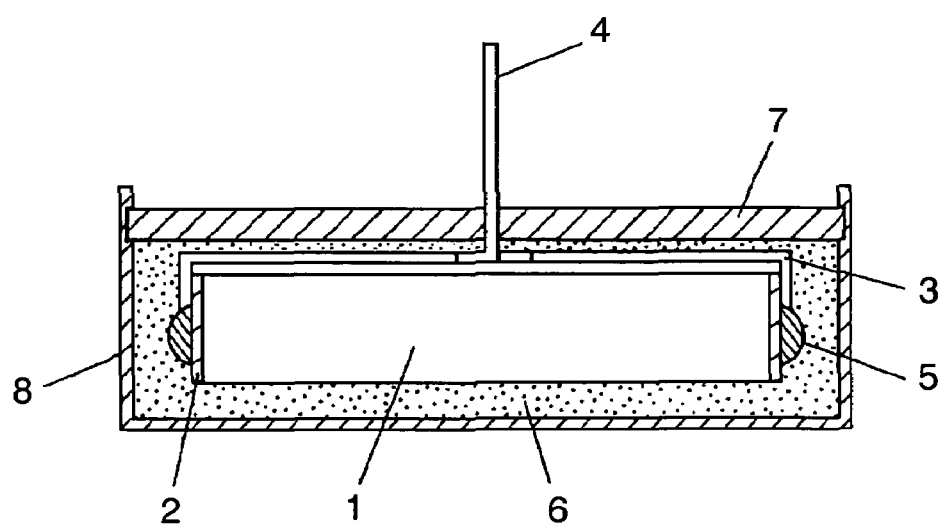
FIG. 1B is a side view as seen from vertical direction of spray electrode of film capacitor of embodiment 1 of the invention.

A configuration embodiment 1 of the invention is described while referring to the accompanying drawings. FIG. 1A is a side view as seen from spray electrode direction of film capacitor. FIG. 1B is a side view as seen from vertical direction of spray electrode of film capacitor.

FIG. 1A and FIG. 1B show a film capacitor 100 of the invention. The film capacitor 100 has a film capacitor element 1 made of polypropylene film of thickness of about 3 μm as dielectric element. On one side of the polypropylene film, aluminum is formed as vapor deposition metal. By winding these two vapor deposition metal films, the film capacitor element 1 is formed.

Two metallized polypropylene films having metal evaporated on one side, being used in the film capacitor element 1, are provided with a fine margin not forming vapor deposition layer at one end in longitudinal direction as generally formed in metallized capacitor conventionally. Two metallized films are overlaid and wound in a direction not to overlay the margin positions, and drawing electrodes are formed at both ends of the wound matter by spray metal.

At the end of film capacitor element 1, an electrode 2 formed, for example, by spraying zinc is formed. "Spraying" is a kind of well-known coating technology for diffusing a desired material of coating to form into fine granules, and spraying to the object of coating to form a film. This is a technique generally employed in forming of electrode of film capacitor.

Electric capacitance of one film capacitor element in embodiment 1 is about 180 μF. In the electrode 2 of two film capacitor elements 1, a bus bar 3 is prepared as copper metal terminal connected by soldering. A terminal 4 is prepared for connecting to an external binding portion integrated with the bus bar 3. The bus bar 3 is designed to cover the film capacitor element 1 by folding. After soldering, electric capacitance of film capacitor 100 is 360 μF. Solder 5 is prepared for connecting the bus bar 3 to the electrode 2 of the film capacitor element 1. The solder is so-called lead-free solder in the composition of 96.5 Sn, 3 Ag and 0.5 Cu.

A first epoxy resin composition 6 is prepared for fixing and sealing the film capacitor element 1 and bus bar 3. Coefficient of linear expansion of first epoxy resin composition 6 is, for example, 37 ppm/K. As inorganic filler, silica is blended by 52 wt. %, and its thermal conductivity is 0.3 W/(m·k). On the first epoxy resin composition 6, a second epoxy resin composition 7 is poured. Coefficient of linear expansion of second epoxy resin composition 7 is smaller than that of first epoxy resin composition 6, and is about 25 ppm/K. As inorganic filler, silica is blended by 69 wt. %, and its thermal conductivity is 0.72 W/(m·k).

In the second epoxy resin composition 7, 2 wt. % of silicone rubber is dispersed and blended (not shown) as flexibility improver. In embodiment 1, thickness of second epoxy resin composition 7 is about 3 mm. Besides, a case 8 of polyphenylene sulfide (PPS) is prepared as container of film capacitor element 1 and bus bar 3.

Figure 2:
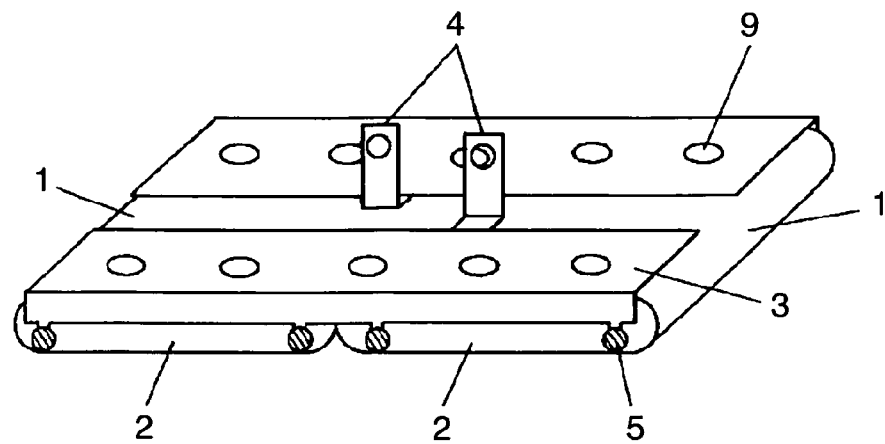
FIG. 2 is a perspective view of film capacitor element and bus bar in embodiment 1.
Figure 3:
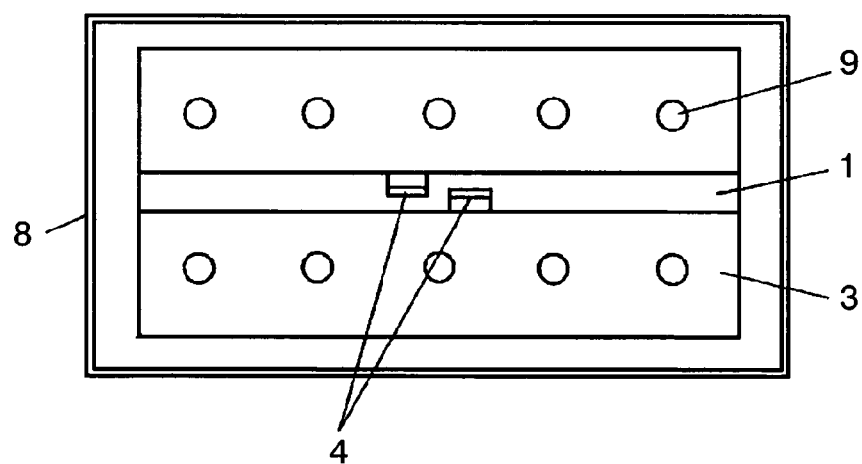
FIG. 3 is a top view of film capacitor element and bus bar in embodiment 1.

FIG. 2 is a perspective view of film capacitor element and bus bar shown in FIGS. 1A and 1B. FIG. 3 is a top view of film capacitor element and bus bar of the same. In FIG. 2 and FIG. 3, same parts as in FIGS. 1A and 1B are identified with same reference numerals.

In FIG. 2 and FIG. 3, holes 9 are formed in the bus bar 3. By forming the holes 9, flow of resin is improved when pouring, and the resin layer formed on the bus bar 3 is strong and is hardly cracked. Shape of holes 9 shown in embodiment 1 is not specified, and same effects as in embodiment 1 are obtained by various shapes of holes.

Area of bus bar 3 disposed to cover the film capacitor element 1 parallel to the bottom of the case 8 is set at about 60% of the opening area of the case 8.

Figure 4:
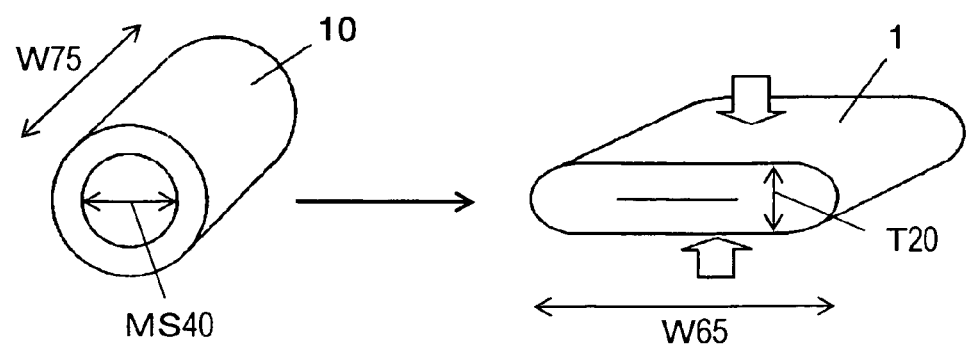
FIG. 4 is a perspective view of flat type film capacitor in embodiment 1.

FIG. 4 shows an example of flat type film capacitor element manufactured in embodiment 1. The film capacitor element 1 is fabricated by winding on a core MS of about 40 mmφ in diameter by a winding machine, removing the core, and pressing the obtained cylindrical element 10. In the film capacitor element 1 in embodiment 1, film width W75 is about 75 mm, and thickness T20 of electrode 2 formed by spraying as seen from the front is about 20 mm, and the size of its lateral width W65 is about 65 mm.

Figure 5:
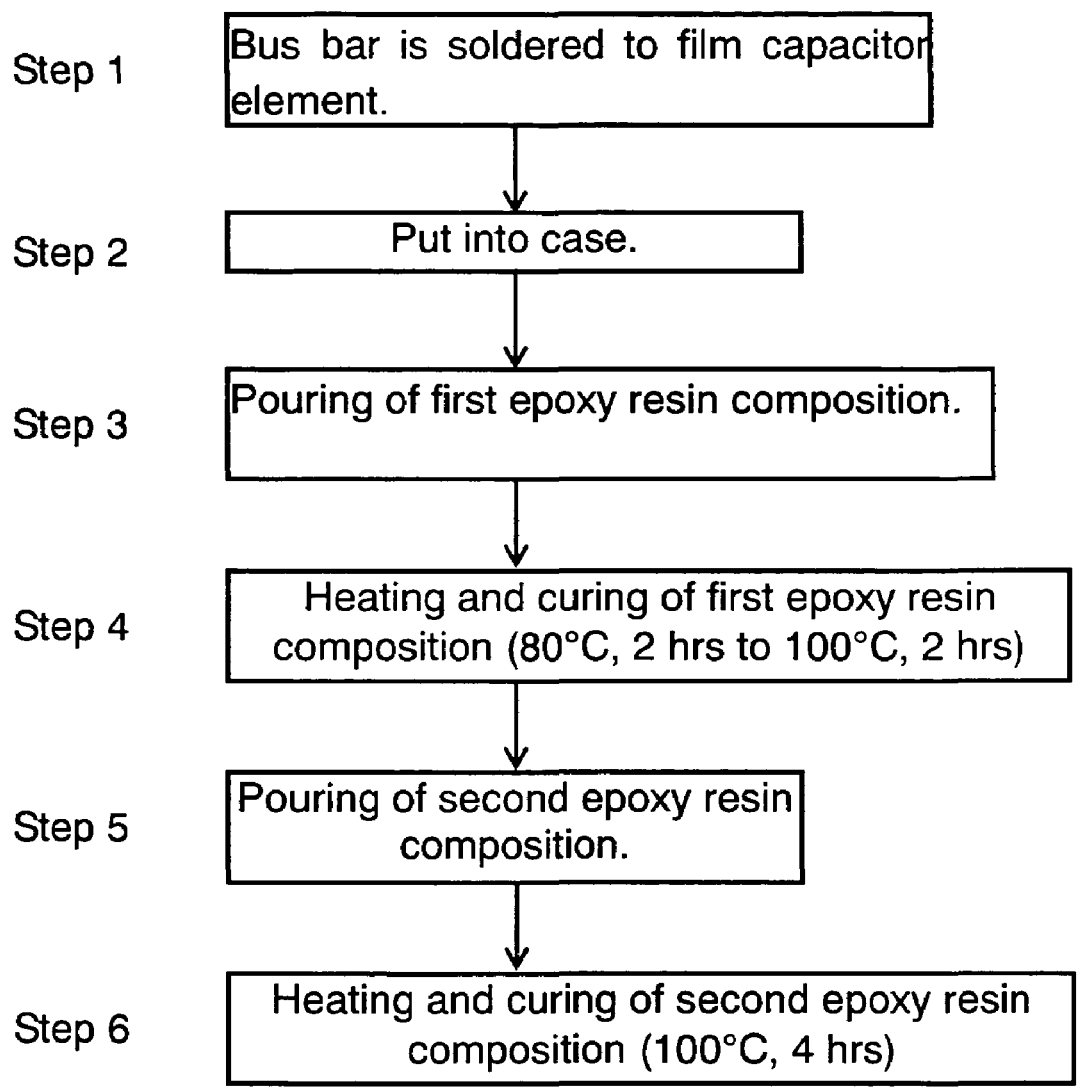
FIG. 5 is an explanatory diagram of manufacturing method of film capacitor in embodiment 1.

FIG. 5 is a flowchart of manufacturing method of film capacitor explained in embodiment 1. Referring to FIG. 5, a manufacturing method of film capacitor in embodiment 1 is explained. First, a step 1, the bus bar 3 is soldered to the flat type film capacitor element 1.

At next step 2, the film capacitor element 1 to which the bus bar 3 is soldered at step 1 is put into the case 8.

At step 3, the first epoxy resin composition 6 is evacuated to a height until the bus bar 3 is immersed. In embodiment 1, liquid viscosity of first epoxy resin composition 6 at 60° C. is 1500 mPa·s. Injection amount is about 300 g.

In embodiment 1, the first epoxy resin composition 6 of liquid viscosity at 60° C. of 1500 mPa·s is used. In the invention, however, the material is not limited to this viscosity. It is preferred to use epoxy resin composition having viscosity at 60° C. of 3000 mPa·s or less. If the viscosity is over 3000 mPa·s, the pouring time becomes too long, and the productivity is lowered.

At step 4, the first epoxy resin composition 6 is heated and cured in a thermostatic oven for 2 hours at 80° C. and 2 hours at 100° C. But the curing condition is not particularly specified. It is preferred to select a curing condition so that the first epoxy resin composition 6 may be cured by 50% or more. If uncured portion is left over, there is no problem if cured completely when curing the second epoxy resin composition 7.

At step 5, on the cured first epoxy resin composition 6, second epoxy resin composition 7 is injected atmospherically in a thickness of about 3 mm. Amount of injection is 90 g.

At step 6, the second epoxy resin composition 7 is heated and cured for 4 hours at 100° C. in thermostatic oven. Subsequently, after specified inspection of electrical characteristics (not shown), the film capacitor of embodiment 1 is completed. Average initial value of five film capacitors thus manufactured is measured, and it is tan δ (1 kHz) of 0.29% at electric capacitance of 360.2 μF.

Thus, by heating and curing the epoxy resin composition in two steps, initial resin distortion in completed product is decreased from the product heated and cured in one step. Accordingly, samples formed by pouring and curing epoxy resin composition in two steps are smaller in thermal stress in heat cycle, and cracks are less likely to be formed.

Moreover, when poured and cured in two steps, defective appearance of resin surface hardly occurs. Defective appearance means spoiling of surface by sink marks, bubble marks, solder flux floating marks, or other defects. In car-mount capacitor application, large electric capacitance of thin type is preferred, and area of case opening tends to be wider. According to the knowledge of the inventors accumulated so far, defective appearance is more likely to occur by single injecting step of epoxy resin composition.

Adhesive force at interface of first epoxy resin composition 6 and second epoxy resin composition 7 is very strong because of adhesion of same epoxy resins. Hence, as compared with prior art of two-layer film capacitor of urethane and epoxy, the strength of interface of resins is increased.

The dielectric film, kind of vapor deposition meal, material of bus bar, and material of case used in embodiment 1 of the invention are not particularly specified. For example, the dielectric film may be polyester or PPS. The vapor deposition metal may be zinc, or alloy of aluminum and zinc. The thickness of film is not limited to the thickness of embodiment 1.

The electrode 2 is not limited to zinc used in embodiment 1, but may be tin, lead, nickel, cobalt, or alloy of them.

The bus bar 3 may be made of copper, aluminum, or iron, or the surface of these metal materials may be plate with various metals such as tin or nickel depending on applications for enhancing the corrosion resistance or soldering performance. Tin-plated copper is preferred if low electric resistance and high soldering performance are required.

In embodiment 1, the bus bar 3 has one set of terminals 4. The invention is not limited to this case, and plural sets of bus bar terminals may be raised from the resin surface. In the configuration of raising plural sets of bus bars 3 from the resin surface, crack origins by heat cycle are increased. Therefore, in such configuration, it is effective particularly effective to use the resin proposed in the invention.

Material of case 8 is not limited to PPS, but may include polybutylene terephthalate, polycarbonate, other plastics, aluminum, and other metals.

Shape of film capacitor element 1 is not limited to the flat shape of embodiment 1, but may include wound cylindrical shape, or laminated box shape.

As in embodiment 1, the shape of element is preferred to be flat type for small and thin design. In particular, when the element is formed so that the lateral width of film capacitor element 1 as seen from the electrode side may be 3 times or more of the thickness, dead space can be saved when a plurality of film capacitor elements 1 are arranged, and it is effective to reduce the thickness.

However, as a result of investigation of heat cycle durability of element shape of flatness ratio, it is found that the expansion and shrinkage amount of film capacitor element 1 by heat cycle is increased as the length is extended in the lateral width direction. As a result, effects of thermal stress are increased by interaction with the surrounding epoxy resin composition in heat cycle test. Depending on the case, it is found that tans may be increased, or that cracks are likely to be formed on the surface of epoxy resin composition.

The inventors have intensively studied these problems, and found that the problems can be overcome by composing the epoxy resin composition as proposed in embodiment 1 of the invention. Such resin composition of the invention is particularly effective for reducing the size by applying the large and flat type film capacitor element.

In the invention, the first epoxy resin composition 6 is not limited to the material of embodiment 1. Any resin composition may be used as far as the coefficient of linear expansion is 30 ppm/K or more, and the content of inorganic filler is 63 wt. % or less of the total composition.

If the coefficient of linear expansion of first epoxy resin composition 6 covering the film capacitor element 1 is less than 30 ppm/K, it is unmatched with coefficient of linear expansion of film capacitor element 1, and tan δ is increased in heat cycle test. If the content of inorganic filler is more than 63%, hardness of first epoxy composition 6 is too high, and adverse effects are caused on the film capacitor element 1 in heat cycle test.

When the content of inorganic filler is more than 63%, viscosity of the resin before curing is extremely high, and when pouring into a large case 8, a long pouring time is required, and bubbles are likely to be formed in the resin when pouring in atmosphere. In car-mount capacitor, in particular, since a large electric capacitance is often required, the case size is large. Hence, resin pouring operation efficiency and appearance of completed product are important, and the productivity is largely influenced.

In the invention, the second epoxy resin composition 7 is not limited to the material of embodiment 1. It is preferred to use a material of which coefficient of linear expansion is smallest of first epoxy resin compositions 6 formed in the lower layers, content of inorganic filler is largest, and thermal conductivity is highest. The coefficient of linear expansion is preferably in a range of 10 to 30 ppm/K, the content of inorganic filler is in a range of 63 to 80 wt. %, and the thermal conductivity is in a range of 0.5 W/(m·k) or more.

These values are specified because the coefficient of linear expansion of copper or other metal bus bar 3 is around 20 ppm/K, and by narrowing the difference from coefficient of linear expansion of material of bus bar 3, thermal stress can be reduced in heat cycle test. Cracks can be prevented without using soft resin such as urethane or silicone resin. To bring the coefficient of linear expansion of second epoxy resin composition 7 closer to that of metal, an inorganic filler such as silica must be blended by 63 to 80 wt. %. If blended by more than 80%, it is not preferred because the strength of second epoxy resin composition 7 becomes too brittle.

When the thermal conductivity of second epoxy resin composition 7 is the highest, it is possible to enhance the heat diffusion of second epoxy resin composition 7 disposed on the highest layer that originates cracks. Crack origins are the interface of bus bar 3 and epoxy resin. When the second epoxy resin composition 7 of high thermal conductivity is disposed on the surface layer at the opening side of the case, heat diffusion is improved, and local concentration of thermal stress can be prevented, and it is effective for preventing cracks.

Thickness of second epoxy resin composition 7 is not limited to about 3 mm (injection amount is 90 g) as specified in embodiment 1. A practical thickness range of the composition 7 is 1 to 5 mm. If the thickness is less than 1 mm, physical and mechanical strength is weak, and cracks are likely to be formed by heat cycle. If the thickness is more than 5 mm, the injection amount of resin of high viscosity is increased, and the injection time is longer and the productivity is lowered.

In order not to lower the productivity, if the injection time is shortened, and the resin injection amount per unit time of injection machine is increased, since the resin viscosity is high, the resin may overflow from the case 8 before spreading throughout the inside of the case 8. If the resin of high viscosity is selected, as far as the thickness of second epoxy resin composition 7 is within 1 to 5 mm, only a small amount of injection of epoxy resin is needed, and if the injection speed is low, the injection time is short enough, and there is no serious effect on productivity.

Once the bubble forming positions of film capacity element 1 and bus bar 3 are hardened by vacuum injection of first epoxy resin composition 6, bubbles are not formed if the second epoxy resin composition 7 is poured over in atmosphere, and occurrence of defective appearance can be suppressed.

In embodiment 1, silica is used as inorganic filler to be blended in the second epoxy resin composition 7, but the invention is not limited to this material. For example, alumina, calcium oxide, aluminum hydroxide, silicon nitride, aluminum nitride and other insulating organic materials may be used either alone or in combination. In embodiment 1, a specific amount of spherical silica is blended in the second epoxy resin composition 7 in order to reduce the viscosity.

By increasing the blending amount of inorganic filler, as mentioned above, it is preferred because the coefficient of linear expansion becomes smaller, and the water-absorbing rate of the second epoxy resin composition 7 is lowered. Boiling water-absorbing rate is measured by boiling first epoxy resin composition 6 and second epoxy resin composition 7 for 24 hours. The result is 0.9% and 0.4%, respectively, and the second epoxy resin composition 7 of higher content of inorganic filler is found to be lower in water-absorbing rate. Hence, the epoxy resin composition of the invention is known to prevent resin cracks by heat cycle, and produce a film capacitor of excellent humidity resistance and high reliability.

The flexibility improver dispersed in the second epoxy resin composition 7 is not limited to silicone rubber used in embodiment 1. Same action and effects are obtained by using elastomer (rubber) or resin having a lower glass transition temperature than room temperature and having smaller elasticity than epoxy resin. In particular, elastomer having heat resistance of over 100° C. is preferred.

In embodiment 1, the area of bus bar 3 covering the film capacitor element 1 is 60% of the area of the opening of the case 8, but the area is not particularly specified. Preferably it is 50% or more.

When the film capacitor element 1 is covered with the bus bar 3 at the opening side of the case 8, water invading from the second epoxy resin composition 7 disposed at the opening side is shielded by the bus bar 3, and the time of reaching up to the film capacitor element 1 directly can be retarded. Hence, humidity resistance is improved, as proved from the results of experiments and studies made so far. If the area covered by the bus bar is less than 50%, it is not preferred because the humidity resistance in power feed test at temperature of 85° C. and humidity of 85% is lowered.

When the covering area of the film capacitor element 1 by the bus bar 3 is more than 50%, heat releasing performance in ripple current feed test is improved, and heat generation of film capacity is reduced.

For example, when ripple current of 70 A (10 kHz) is applied to the film capacitor in embodiment 1, the terminal 4 is heated to highest temperature. This heat is transmitted from the bus bar 3 disposed in the resin to the electrode 2, and reaches up to the film capacitor element 1.

In such a case, by increasing the area of the bus bar 3 covering the film capacitor element 1 at the opening side of the case 8, heat is easily released to the side of the second epoxy resin composition 7. As a result, heat damage applied to the film capacitor element 1 can be suppressed. By selecting the thermal conductivity of first epoxy resin composition 6 and second epoxy resin composition 7 at 0.3 W/(m·k) and 0.72 W/(m·k), respectively, a heat releasing structure of second epoxy resin composition 7 is easily realized.

Besides, when the covering area of film capacitor element 1 by the bus bar 3 is increased, the inductance can be decreased. If the inductance is large, surge voltage is large, and the semiconductor device used in the film capacitor may be broken. It is hence effective as anti-surge measure to minimize the inductance of film capacitor.

However, when the area of the bus bar 3 is increased in order to lower the inductance, cracks are likely to be formed in the epoxy resin by heat cycle. In the light of this phenomenon, the inventors have discovered that the epoxy resin composition proposed in the invention is effective for improving the heat cycle tolerance while maintaining low heat generation and low inductance characteristic by increasing the area of the bus bar 3.

The film capacitor of the invention composed of such epoxy resin composition is excellent in all aspects of low heat generation, low impedance, heat cycle tolerance, humidity resistance, and productivity.

To verify the performance of the film capacitor of the invention, the film capacitor of embodiment 1 is tested to evaluate pouring work efficiency, appearance defects (in 100 completed products), cold heat cycle test performance (−40 to 105° C., 1000 cycles), and high temperature and high humidity power feed test performance (temperature 85° C., relative humidity 85%, direct-current voltage 600 V, 2000 hours).

Results are shown in Table 1. Electric capacitance change rate is expressed in percentage by dividing the change amount of electric capacitance by the initial electric capacitance. Values of heat cycle test and high temperature and high humidity test in Table 1 are average values of five samples.

Pouring work efficiency is rejected (x) if the resin distribution time exceeds 90 seconds. Appearance of completed product is rejected if obvious shrinkage cavity, bubble marks, or loose solder flux is found. Heat cycle test or high temperature and high humidity test is rejected if capacity decrease rate (ΔC/C) exceeds −5%, or tan δ after test exceeds 0.6%, or cracks are found during test.

Embodiment 2

In embodiment 2, the coefficient of thermal expansion of second epoxy resin composition 7 of embodiment 1 is 22 ppm/K. All other specifications and conditions are same as in embodiment 1. As compared with embodiment 1, the coefficient of linear expansion is reduced by increasing the amount of inorganic filler to 75 wt. %.

In the film capacity of embodiment 2, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

Embodiment 3

In embodiment 3, the coefficient of thermal expansion of first epoxy resin composition 6 of embodiment 1 is 32 ppm/K. All other specifications and conditions are same as in embodiment 1. As compared with embodiment 1, the coefficient of linear expansion is raised by decreasing the amount of inorganic filler to 48 wt. %.

In the film capacity of embodiment 3, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

Embodiment 4

In embodiment 4, the thickness of second epoxy resin composition 7 of embodiment 1 is 1 mm. All other specifications and conditions are same as in embodiment 1. In this film capacitor, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

Embodiment 5

In embodiment 5, the area of the bus bar 3 covering the film capacitor element 1 is decreased to 50%. All other specifications and conditions are same as in embodiment 1.

In the film capacitor of embodiment 5, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

Embodiment 6

Figure 6:
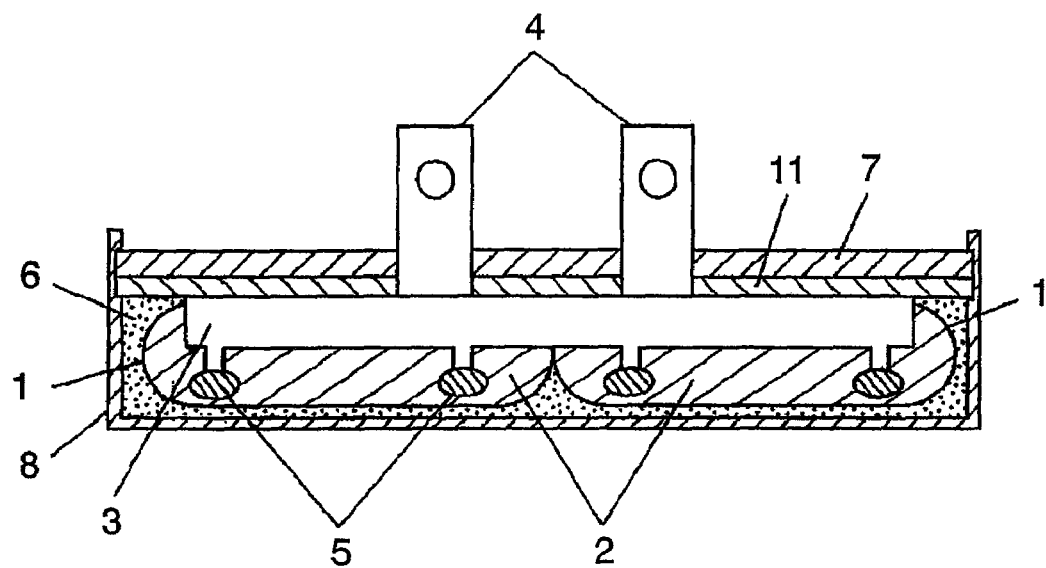
FIG. 6 is a side view as seen from spray electrode direction of film capacitor of embodiment 6 of the invention.
Figure 7:
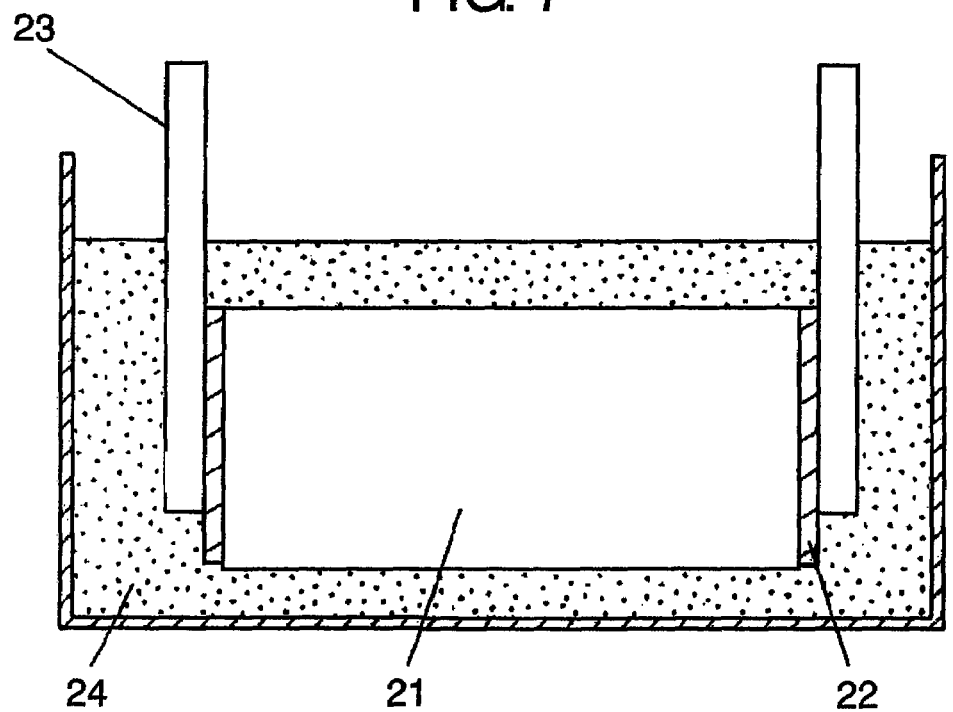
FIG. 7 is a sectional view of conventional film capacitor.

The configuration of embodiment 6 is explained by referring to the drawing. FIG. 6 is a sectional view of the film capacitor of embodiment 6.

In embodiment 6, a third epoxy resin composition 11 is disposed between the first epoxy resin composition 6 and second epoxy resin composition 7 of embodiment 1. All other specifications and conditions are same as in embodiment 1. Same parts of embodiment 6 as in embodiment 1 are identified with same reference numerals as in embodiment 1. The coefficient of linear expansion of third epoxy resin composition 11 is 29 ppm/K.

In the film capacitor of embodiment 6, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

The invention is not limited to two-layer epoxy resin structure, but may be composed of three layers as in embodiment 6, or more layers, and same heat cycle tolerance and humidity resistance area obtained by decreasing the coefficient of linear expansion of the epoxy resin of the uppermost layer.

Comparative Example 1

In comparative example 1, only one type of epoxy resin composition in embodiment 1 is poured, and the coefficient of linear expansion of epoxy resin composition is 35 ppm/K. All other specifications and conditions are same as in embodiment 1.

In the film capacitor of comparative example 1, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 1, resin pouring work efficiency is favorable, but defects such as loose solder flux or large shrinkage cavity are found in 5 out of 100 products in the appearance of products completed by one pouring only. Since coefficient of linear expansion is over 30 ppm/K in the resin surface layer at crack origins, in heat cycle test, cracks are formed at the interface of terminal 4 and epoxy resin layer in all samples.

Comparative Example 2

In comparative example 2, only one type of epoxy resin composition in embodiment 1 is poured, and the coefficient of linear expansion of epoxy resin composition is 25 ppm/K. All other specifications and conditions are same as in embodiment 1. In comparative example 2, resin of viscosity at 60° C. of 1200 mPa·s is injected only once.

In the film capacitor of comparative example 2, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 2, since the epoxy resin of high viscosity is used, the injection time is about 4 times longer than in embodiment 1, and the working efficiency is poor. When the injection time is shorted and injection speed is increased, overflow of epoxy resin is noted.

Due to single pouring process, defects such as loose solder flux or defective appearance is found in 15 products. Since coefficient of linear expansion of epoxy resin for covering film capacitor element is 25 ppm/K, tan δ after heat cycle text is over 0.6%.

Comparative Example 3

In comparative example 3, instead of the first and second epoxy resin compositions in embodiment 1, urethane resin of coefficient of linear expansion of 200 ppm/K is poured only once. All other specifications and conditions are same as in embodiment 1.

In the film capacitor of comparative example 3, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 3, since urethane epoxy resin of low viscosity is used, the working efficiency is favorable. But due to single pouring process, defective appearance is found in 3 products.

In heat cycle test, cracks are not found, but tan δ is increased. Since urethane is soft, it is not effective to suppress thermal expansion or shrinkage of film capacitor element, and is likely to deteriorate characteristics. This suggests that the function of suppressing expansion and shrinkage of film capacitor element properly is required in the resin for covering the element.

Since urethane is higher in water absorption than epoxy, it is evident that capacity decrease is large in high temperature and high humidity power feed test.

Comparative Example 4

In comparative example 4, instead of the second epoxy resin composition in embodiment 1, epoxy resin composition of coefficient of linear expansion of 39 ppm/K and thermal conductivity of 0.29 W/(m·k) is used. All other specifications and conditions are same as in embodiment 1.

In the film capacitor of comparative example 4, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 4, as the material for second epoxy resin composition, a material of coefficient of linear expansion of 30 ppm/K or more and thermal conductivity smaller than that of the first epoxy resin is used. As a result, in heat cycle test, cracks are formed in all samples.

Comparative Example 5

In comparative example 5, instead of the first epoxy resin composition in embodiment 1, epoxy resin composition of viscosity at 60° C. of 20000 mPa·s and coefficient of linear expansion of hardened matter of 20 ppm/K is used. All other specifications and conditions are same as in embodiment 1.

In the film capacitor of comparative example 5, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 5, since epoxy resin of high viscosity is used, the pouring work efficiency does not satisfy specified standard. Since the coefficient of linear expansion of first epoxy resin for covering the film capacitor element is less than 30 ppm/K, tan δ is over 0.6% in heat cycle test.

Comparative Example 6

In comparative example 6, the area of bus bar for covering the film capacitor element in embodiment 1 is reduced to 30%. All other specifications and conditions are same as in embodiment 1.

Since the bus bar area is reduced, heat generation in ripple current feed test is increased by 5 K from embodiment 1, and the inductance is increased by about 15 nH.

In the film capacitor of comparative example 6, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 6, since the area of bus bar for covering the film capacitor element is less than 50%, the capacity decrease rate in high temperature and high humidity power feed test exceeds the tolerance range of +/−5%.

Comparative Example 7

In comparative example 7, the thickness of second epoxy resin composition in embodiment 1 is 0.5 mm. All other specifications and conditions are same as in embodiment 1.

In the film capacitor of comparative example 7, test results of pouring work efficiency, appearance defects (in 100 completed products), cold heat cycle test (−40 to 105° C., 1000 cycles), and high temperature and high humidity power feed test (temperature 85° C., relative humidity 85%, direct-current voltage 600 V, 2000 hours) are shown in Table 1. Electric capacitance change rate is expressed in percentage by dividing the change amount of electric capacitance by the initial electric capacitance. Values of heat cycle test and high temperature and high humidity test are average values of five samples. Criteria of tests are same as in embodiment 1.

In comparative example 7, the thickness of second epoxy resin composition is formed relatively thin at less than 1 mm. Accordingly, fine cracks are formed in 2 out of 5 products in heat cycle test.

(The Gist and Features of the Invention)

The gist and features of the invention will be clarified from the explanation above. Essential points are summarized as follows.

The film capacitor of the invention comprises a film capacitor element, a metal terminal connected to the electrode of this film capacitor element, and a case for containing them. The film capacitor element and metal electrode are packed within the case by plural layers of epoxy resin composition. The plural layers of epoxy resin composition are formed in layers, and are composed so that the coefficient of linear expansion may be smallest in the epoxy resin composition disposed in the uppermost layer. In other example, the blending amount of inorganic filler is set largest in the epoxy resin composition disposed in the uppermost layer. Or the thermal conductivity is set highest in the epoxy resin composition disposed in the uppermost layer.

In these configurations, difference in coefficient of linear expansion may be decreased between the epoxy resin composition disposed in the uppermost layer which originates cracks, and the metal terminal, and thereby occurrence of resin cracks due to heat cycle can be prevented. Still more, a film capacitor of excellent humidity resistance and high reliability is obtained.

The coefficient of linear expansion is selected somewhere between 10 and 30 ppm/K in the epoxy resin composition disposed in the uppermost layer.

As a result, difference in coefficient of thermal expansion may be decreased between the epoxy resin composition disposed in the uppermost layer which originates cracks, and the metal terminal. Occurrence of resin cracks due to heat cycle can be prevented, and a film capacitor of excellent humidity resistance and high reliability is obtained.

In the epoxy resin composition disposed in the uppermost layer, inorganic filler is blended by 63 to 80 wt. %. As a result, difference in coefficient of thermal expansion may be decreased between the epoxy resin composition disposed in the uppermost layer which originates cracks, and the metal terminal. Occurrence of resin cracks due to heat cycle can be prevented, and a film capacitor of excellent humidity resistance and high reliability is obtained.

The thermal conductivity is set at 0.5 W/(m·k) or more in the epoxy resin composition disposed in the uppermost layer. As a result, heat diffusion can be enhanced in the epoxy resin composition disposed in the uppermost layer which originates cracks, and local thermal stress can be relaxed. As a result, occurrence of resin cracks due to heat cycle can be prevented, and a film capacitor of excellent in humidity resistance and low exothermic characteristic and high in reliability is obtained.

The coefficient of linear expansion of the epoxy resin composition directly covering the film capacitor element is 30 ppm/K or more. As a result, matching is improved between the thermal expansion and shrinkage of film capacitor element and the thermal expansion and shrinkage of epoxy resin component for covering it, and stress applied to the film capacitor element in heat cycle can be suppressed low. Hence, a film capacitor of high reliability is obtained.

Inorganic filler is blended by 63 wt. % or less in the epoxy resin composition directly covering the film capacitor element. As a result, matching is improved between the thermal expansion and shrinkage of film capacitor element and the thermal expansion and shrinkage of epoxy resin component for covering it. Hence stress applied to the film capacitor element in heat cycle can be suppressed low, and a film capacitor of high reliability is obtained.

In the film capacitor, thickness of epoxy resin layer in the uppermost layer is 1 to 5 mm. As a result, difference in coefficient of thermal expansion may be decreased between the epoxy resin composition disposed in the uppermost layer which originates cracks, and the metal terminal. Occurrence of resin cracks due to heat cycle can be prevented, and a film capacitor of excellent humidity resistance and high reliability is obtained.

The shape of film capacitor element is flat shape, and the breadth of flat film capacitor element is 3 times or more of the thickness. As a result, the film capacitor is reduced in size and thickness, and deterioration of capacitor characteristics due to heat cycle can be prevented.

The metal terminal is a copper plate. Since the coefficient of linear expansion of copper is 17 to 19 ppm/K, difference in coefficient of linear expansion may be decreased between the epoxy resin composition disposed in the uppermost layer, and the metal terminal. Occurrence of resin cracks due to heat cycle can be prevented, and a film capacitor of excellent humidity resistance and high reliability is obtained.

The metal terminal is made of epoxy resin composition, and is raised from within the resin to an external fitting part. Part of metal terminal in the epoxy resin composition is disposed to cover the film capacitor element in a plane at a position closer to the opening of the case from the film capacitor element, in parallel to the bottom of the case. As a result, the metal terminal disposed to cover the film capacitor element plays the role of preventing humidity from invading directly into the element.

Part of the metal terminal disposed at the opening side of the case so as to cover the film capacitor element in a plane within epoxy resin composition has an area of 50% or more of the area of the case opening, and has holes opened in several positions. As a result, the metal terminal disposed to cover the film capacitor element plays the role of preventing humidity from invading directly into the film capacitor element. Besides, by opening the holes, it is effective to enhance the strength of epoxy resin composition existing on the film capacitor element.

The epoxy resin composition in the uppermost layer is disposed higher than part of the metal terminal in a plane disposed in parallel to the case bottom. As a result, cracks by heat cycle can be prevented, and a film capacitor of enhanced humidity resistance, and low heat generation is obtained.

In the epoxy resin composition in the uppermost layer, a flexibility improver of smaller elasticity than the epoxy resin is diffused. As a result, the flexibility improver in the epoxy resin composition in the uppermost layer has an action of absorbing stress, and resin cracks due to heat cycle can be prevented. Thus, a film capacitor excellent in reliability is obtained.

The film capacitor of the invention is used in a car-mount inverter system. The car-mount film capacitor is required to have large current tolerance, terminal structure for reducing surge voltage as much as possible, heat cycle tolerance, and high temperature and high humidity durability. The film capacitor of the invention has a low exothermic properly if a large current flows by using a wide bus bar and lowering the current density. Further, since the cooling area of the bus bar is wide, it is suited to large current application. Also by using the wide bus bar, a low inductance structure is formed, and the surge voltage can be decreased.

When wide bus bar is used, cracks are likely to be formed in the epoxy resin by heat cycle, but this problem can be solved by using an epoxy resin composition resistant to heat cycle in the uppermost layer, and a film capacitor having an excellent heat cycle durability is obtained. By using the wide bus bar for covering the film capacitor element, and using the epoxy resin composition resistant to heat cycle in the uppermost layer, durability of high temperature and high humidity is enhanced.

As a result, an automobile of high performance mounting an inverter system excellent in low exothermic property, low impedance property, heat cycle resistance, and humidity resistance is obtained.

A manufacturing method of film capacitor of the invention comprises a step of connecting a metal terminal to electrode of film capacitor element. It also comprises a step of putting the film capacitor element into a case together with metal terminal, and a step of pouring a first epoxy resin composition. It further comprises a step of heating and curing the poured first epoxy resin composition for a specified time, and a step of pouring a second epoxy resin composition of smaller coefficient of linear expansion than the first epoxy resin composition, on the first epoxy resin composition. It also comprises a step of heating and curing the poured second epoxy resin composition for a specified time.

As a result, the resin pouring time at each step is short, and the productivity is excellent.

In the manufacturing method of film capacitor of the invention, liquid viscosity of first epoxy resin composition is 3000 mPa·s at 60° C. Hence, the time of injecting a large amount of first epoxy resin composition is shortened, and the productivity is excellent.

The second epoxy resin composition has a coefficient of linear expansion after curing is 10 to 30 ppm/K.

As a result, difference in coefficient of thermal expansion may be decreased between the second epoxy resin composition which tends to originate cracks, and the metal terminal. Occurrence of resin cracks due to heat cycle can be prevented, and a manufacturing method of film capacitor of excellent humidity resistance and high reliability is obtained.

In the second epoxy resin composition, inorganic filler is blended by 63 to 80 wt. %. As a result, difference in coefficient of thermal expansion may be decreased between the second epoxy resin composition which tends to originate cracks, and the metal terminal. Occurrence of resin cracks due to heat cycle can be prevented, and a manufacturing method of film capacitor of excellent humidity resistance and high reliability is obtained.

INDUSTRIAL APPLICABILITY

The film capacitor of the invention, using the wide bus bar, is excellent in heat cycle resistance and humidity resistance while maintaining the low exothermic characteristic and low inductance characteristic, and is useful as film capacitor used in car-mount inverter system, and hence brings out high industrial applicabilities

TABLE 1

| | Pouring work efficiency | Appearance defects | Heat cycle test result | | | | High temperature and high humidity test | | | Overall evaluation |
|---|---|---|---|---|---|---|---|---|---|---|
| | | | ΔC/C (%) | tanδ (%) | Cracks | Judgement | ΔC/C (%) | tanδ (%) | Judgement | |
| Embodiment 1 | ○ | 0/100 | 0.02 | 0.295 | 0/5 | ○ | −0.54 | 0.301 | ○ | ○ |
| Embodiment 2 | ○ | 0/100 | 0.05 | 0.301 | 0/5 | ○ | −0.31 | 0.310 | ○ | ○ |
| Embodiment 3 | ○ | 0/100 | 0.01 | 0.311 | 0/5 | ○ | −0.45 | 0.315 | ○ | ○ |
| Embodiment 4 | ○ | 0/100 | −0.03 | 0.325 | 0/5 | ○ | −0.12 | 0.320 | ○ | ○ |
| Embodiment 5 | ○ | 0/100 | 0.04 | 0.298 | 0/5 | ○ | −1.2 | 0.330 | ○ | ○ |
| Embodiment 6 | ○ | 0/100 | 0.01 | 0.310 | 0/5 | ○ | −0.38 | 0.297 | ○ | ○ |
| Comparative example 1 | ○ | 5/100 | 0.01 | 2.103 | 5/5 | × | −3.1 | 0.341 | ○ | × |
| Comparative example 2 | × | 15/100 | −0.25 | 0.65 | 0/5 | × | −0.25 | 0.302 | ○ | × |
| Comparative example 3 | ○ | 3/100 | −0.80 | 1.520 | 0/5 | × | −12.3 | 0.402 | × | × |
| Comparative example 4 | ○ | 0/100 | −0.51 | 0.925 | 5/5 | × | −0.32 | 0.302 | ○ | × |
| Comparative example 5 | × | 0/100 | −0.51 | 0.67 | 0/5 | × | −0.32 | 0.302 | ○ | × |
| Comparative example 6 | ○ | 0/100 | 0.02 | 0.295 | 0/5 | ○ | −9.3 | 0.412 | × | × |
| Comparative example 7 | ○ | 0/100 | 0.03 | 0.301 | 2/5 | × | −1.2 | 0.321 | ○ | × |

The invention claimed is:

1. A film capacitor comprising a film capacitor element, a metal terminal connected to an electrode of the film capacitor element, and a case for containing them, wherein the film capacitor element and metal electrode are packed within the case by a plural layers of epoxy resin composition, and the plural layers of epoxy resin composition are composed so that the coefficient of linear expansion is smallest in the epoxy resin composition disposed in the uppermost layer.

2. The film capacitor of claim 1, wherein the coefficient of linear expansion is between 10 and 30 ppm/K in the epoxy resin composition disposed in the uppermost layer.

3. The film capacitor of claim 1, wherein the coefficient of linear expansion of an epoxy resin composition directly covering the film capacitor element is 30 ppm/K or more.

4. The film capacitor of claim 1, wherein thickness of the uppermost layer is 1 to 5 mm.

5. The film capacitor of claim 1, wherein the shape of film capacitor element is flat shape, and the breadth of flat film capacitor element is 3 times or more of the thickness.

6. The film capacitor of claim 1, wherein the metal terminal is a copper plate.

7. The film capacitor of claim 1, wherein the metal terminal is raised from within the epoxy resin composition to an external fitting part, and part of the metal terminal in the epoxy resin composition is disposed to cover the film capacitor element in a plane at a position closer to the opening of the case from the film capacitor element, in parallel to the bottom of the case.

8. The film capacitor of claim 7, wherein part of the metal terminal disposed at the opening side of the case so as to cover the film capacitor element in a plane within epoxy resin composition has an area of 50% or more of the area of the case opening, and has holes opened in several positions.

9. The film capacitor of claim 1, wherein the epoxy resin composition in the uppermost layer is disposed higher than part of the metal terminal in a plane disposed in parallel to the case bottom.

10. The film capacitor of claim 1, wherein a flexibility improver of smaller elasticity than the epoxy resin is diffused in the epoxy resin composition in the uppermost layer.

11. The film capacitor of claim 1, wherein the film capacitor is used in a car mount inverter system.

* * * * *